(12) United States Patent
Vanover

(10) Patent No.: US 11,472,268 B1
(45) Date of Patent: Oct. 18, 2022

(54) THREE-PIECE FLIP WINDSHIELD ASSEMBLY

(71) Applicant: Super ATV, LLC, Madison, IN (US)

(72) Inventor: Justin Vanover, Holton, IN (US)

(73) Assignee: Super ATV, LLC, Madison, IN (US)

(*) Notice: Subject to any disclaimer, the term of this patent is extended or adjusted under 35 U.S.C. 154(b) by 0 days.

(21) Appl. No.: 17/660,040

(22) Filed: Apr. 21, 2022

Related U.S. Application Data

(60) Provisional application No. 63/209,605, filed on Jun. 11, 2021.

(51) Int. Cl.
*B60J 1/04* (2006.01)
*B60J 10/72* (2016.01)

(52) U.S. Cl.
CPC ............... *B60J 1/04* (2013.01); *B60J 10/72* (2016.02)

(58) Field of Classification Search
CPC ..... B60J 1/04; B60J 1/06; B60J 10/72; B60Y 2200/124; B60Y 2200/20
USPC ....................................... 296/77.1
See application file for complete search history.

(56) References Cited

U.S. PATENT DOCUMENTS

| | | | | |
|---|---|---|---|---|
| 2,355,264 | A * | 8/1944 | Bloomfield | B60J 1/04 296/96.13 |
| 7,165,802 | B1 * | 1/2007 | Flynn | B60J 1/06 296/87 |
| 7,380,860 | B2 * | 6/2008 | Dolan | B60J 10/30 296/84.1 |
| 7,665,792 | B1 * | 2/2010 | Flynn | B60J 1/06 296/87 |
| 10,124,654 | B2 * | 11/2018 | Martin | B60J 1/006 |
| 11,305,619 | B1 * | 4/2022 | Vanover | B60J 10/72 |

* cited by examiner

*Primary Examiner* — Pinel E Romain
(74) *Attorney, Agent, or Firm* — Woodard, Emhardt, Henry, Reeves & Wagner, LLP

(57) ABSTRACT

A windshield assembly for an off-road vehicle includes an upper piece, a lower piece, and a middle piece. The upper piece abuts the roof to prevent a noticeable gap between the windshield and the roof regardless of whether the windshield is open or closed. The lower piece spans the lowermost portion of the windshield area. The middle piece is the main viewing portion, and is hingedly attached to the upper piece to allow the main viewing portion to be moved from a closed position to one or more open positions. When the middle piece is in its closed position, it substantially spans the space between the upper piece and the lower piece. When the middle piece is in a fully open position, the space between the upper windshield piece and the lower windshield piece is substantially free of windshield protection. When the middle piece is in a partially open position, it is flipped partially upward so that air may flow relatively freely unto the cabin area under the middle piece, but the vehicle occupants are still substantially protected from harsh wind and rain.

8 Claims, 9 Drawing Sheets

THREE-PIECE FLIP WINDSHIELD ASSEMBLY

REFERENCE TO RELATED APPLICATIONS

This application claims priority from U.S. Provisional Patent Application Ser. No. 63/209,605, filed Jun. 11, 2021, the entire contents of which is hereby incorporated herein by reference.

FIELD OF THE INVENTION

The present invention related generally to motor vehicles, and more particularly to windshields for off-road motor vehicles.

BACKGROUND TO THE INVENTION

Flip windshields are commonly used on off-road vehicles such as all-terrain vehicles (ATVs) and utility task vehicles (UTVs). Such windshields allow the driver to position the windshield to provide normal windshield protection, or to position the windshield so that the area immediately in front of the driver is substantially free of a blocking windshield. Typically, this is accomplished by flipping the windshield from a lowered position to a raised position.

Prior art flip windshields have disadvantages when used with vehicles equipped with a roof, and may not provide full protection even when the windshield is closed. The present invention addresses those needs, and may provide distinctive, source-identifying design elements in the product as well.

SUMMARY OF THE INVENTION

In one preferred aspect of the present invention there is provided a removable windshield assembly for attachment to the cage of a vehicle. In one embodiment, that inventive windshield assembly comprises:

a) an upper portion adapted to abut the roof of the vehicle in a manner to prevent a gap between the roof and the windshield and substantially spanning the uppermost portion of the area between the left vertical member and the right vertical member;

b) a lower portion substantially spanning a lowermost portion of the area between the left vertical member and the right vertical member; and c) a main viewing portion hingedly attached to the upper portion in a manner effective to allow the main viewing portion to be moved from a closed position to an open position;

wherein when the main viewing portion is in its closed position the main viewing portion substantially spans the space between the upper portion, the lower portion, the left vertical member, and the right vertical member;

and when the main viewing portion is in its open position the space between the upper portion, the lower portion, the left vertical member, and the right vertical member is substantially free of windshield protection.

In another embodiment the inventive windshield assembly comprises a multiple-piece windshield assembly of at least three parts, configured to mount to a vehicle having a left vertical member and a right vertical member and at least one cross support member connecting the left vertical member and a right vertical member. Such an assembly may comprise:

a) a lower fixed windshield portion spanning a lower portion of the area between the left vertical member and the right vertical member;

b) an upper fixed windshield portion spanning an upper portion of the area between the left vertical member and the right vertical member;

c) a central, movable windshield portion hingedly connected to the upper fixed windshield portion and adapted to substantially span the area between the upper fixed windshield portion and the lower fixed windshield portion when positioned in a closed position; wherein the central, movable windshield portion is movable to a fully-open position in which a gap of more than about 24" is provided between the central, movable windshield portion and the lower fixed windshield portion. It is to be appreciated that the gap of about 24" may not be provided in all embodiments, with the critical feature being that the windshield is adapted to open enough that the openable windshield portion is above the line of sight of a normal driver.

In some embodiments, the central, movable windshield portion is also movable to a partially-open position in which a gap of less than about 6" is provided between the central, movable windshield portion and the lower fixed windshield portion.

WRITTEN DESCRIPTION

Figure 1:
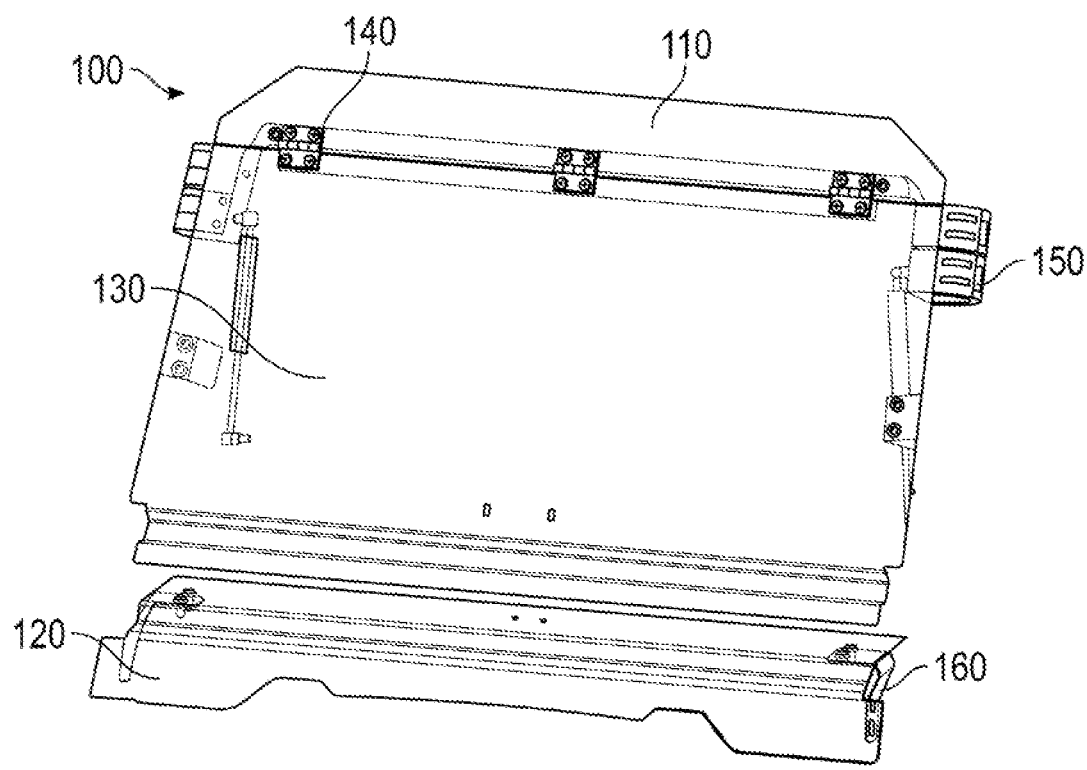
FIG. 1 shows a perspective of the hinged, three-piece windshield of the present invention, according to one embodiment.

For the purposes of promoting an understanding of the principles of the invention, reference will now be made to certain embodiments and specific language will be used to describe the same. It will nevertheless be understood that no limitation of the scope of the invention is thereby intended, such alterations and further modifications in the described device, and such further applications of the principles of the invention as illustrated therein, being contemplated as would normally occur to one skilled in the art to which the invention relates.

As indicated above, one aspect of the present invention relates to a removable windshield assembly for attachment to the cage of a vehicle. As is known to the art, a vehicle cage typically comprises a pair of lateral support members, one on each side of a passenger compartment, and a horizontal cross member spanning the distance between the two vertical support members. While not always considered to be part of the cage, the structure may optionally include a vehicle roof member.

In one embodiment the inventive windshield assembly comprises:
  a) an upper portion adapted to abut the roof of the vehicle in a manner effective to prevent a noticeable gap between the roof and the windshield and substantially spanning the uppermost portion of the area between the left vertical member and the right vertical member;
  b) a lower portion adapted to abut the hood of the vehicle in a manner effective to prevent a noticeable gap between the hood and the windshield and substantially spanning a lowermost portion of the area between the left vertical member and the right vertical member; and
  c) a main viewing portion hingedly attached to the upper portion in a manner effective to allow the main viewing portion to be moved from a closed position to an open position, and substantially spanning the space between the upper portion and the lower portion between the left vertical member and the right vertical member;
  wherein when the main viewing portion is in its closed position the main viewing portion substantially spans the space between the upper portion, the lower portion, the left vertical member, and the right vertical member;
  and when the main viewing portion is in its open position the space between the upper portion, the lower portion, the left vertical member, and the right vertical member is substantially free of windshield protection.

In another embodiment the inventive windshield assembly comprises a multiple-piece windshield assembly of at least three parts, configured to mount to a vehicle having a left vertical member and a right vertical member and at least one cross support member connecting the left vertical member and a right vertical member. Such an assembly may comprise:
  a) a lower fixed windshield portion adapted to abut the hood of the vehicle in a manner effective to prevent a noticeable gap between the hood and the windshield, and spanning the lower portion of the area between the left vertical member and the right vertical member;
  b) an upper fixed windshield portion adapted to abut the roof of the vehicle in a manner effective to prevent a noticeable gap between the roof and the windshield and spanning the upper portion of the area between the left vertical member and the right vertical member;
  c) a central, movable windshield portion hingedly connected to the upper fixed windshield portion and adapted to substantially span the area between the upper fixed windshield portion and the lower fixed windshield portion when positioned in a closed position; wherein the central, movable windshield portion is movable to a partially-open position in which a gap of less than about 6" is provided between the central, movable windshield portion and the lower fixed windshield portion, and is further movable to a fully-open position in which a gap of more than about 24" is provided between the central, movable windshield portion and the lower fixed windshield portion.

In some embodiments the upper fixed windshield portion is attached to the cross support member; and the lower fixed windshield portion and the central, movable windshield portion are each attached to the left vertical member and to the right vertical member. With this construction, the upper piece abuts the roof to prevent a noticeable gap between the windshield and the roof regardless of whether the windshield is open or closed. The lower piece spans the lowermost portion of the windshield area. The middle piece is the main viewing portion, and is hingedly attached to the upper piece to allow the main viewing portion to be moved from a closed position to one or more open positions. Using an upper piece that abuts the roof to prevent substantial airflow into the cabin at the roof line, and connecting that upper piece to the main windshield piece with a hinged connection that prevents substantial airflow into the cabin between the upper and middle windshield pieces, serves to prevent wind and rain from flowing into the cabin area between the roof and the main windshield section regardless of whether the windshield is open or closed.

Accordingly, when the middle piece is in its closed position, it substantially spans the space between the upper piece and the lower piece. When the middle piece is in a fully open position, the space between the upper windshield piece and the lower windshield piece is substantially free of windshield protection. When the middle piece is in a partially open position, it is flipped partially upward so that air may flow relatively freely unto the cabin area under the middle piece, but the vehicle occupants are still substantially protected from harsh wind and rain.

The assembly may additionally comprise one or more struts for holding the central, movable windshield portion in its fully-open position.

The assembly may also additionally comprise a handle for assisting with moving the central, movable windshield portion from its closed position to its partially- or fully-open positions.

The assembly may also additionally comprise a latch for securing the central, movable windshield portion in its closed position. The latch may additionally be effective for securing the central, movable windshield portion in its partially-open position. The handle and the latch may be provided as a combined assembly.

The inventive flip windshield assembly is preferably adapted to clear the vehicle roof so that opening and closing the flip windshield is not inhibited.

The inventive flip windshield assembly is preferably adapted to substantially seal the space across the top of the windshield, thus preventing fluids such as rain and air from flowing over the top of the windshield and beneath the vehicle roof.

Referring to the drawings, FIG. 1 shows one embodiment of the three-piece flip windshield of the present invention. Windshield 100 includes upper piece 110, lower piece 120, and middle piece 130. Hinges 140 connect middle piece 130 to upper piece 110 in a manner effective to prevent air or rain from flowing into the cabin between those two pieces regardless of whether the middle piece is in its closed position or an open position. Upper clamps 150 and lower clamps 160 are provided to secure the windshield to the vehicle.

Figure 2:
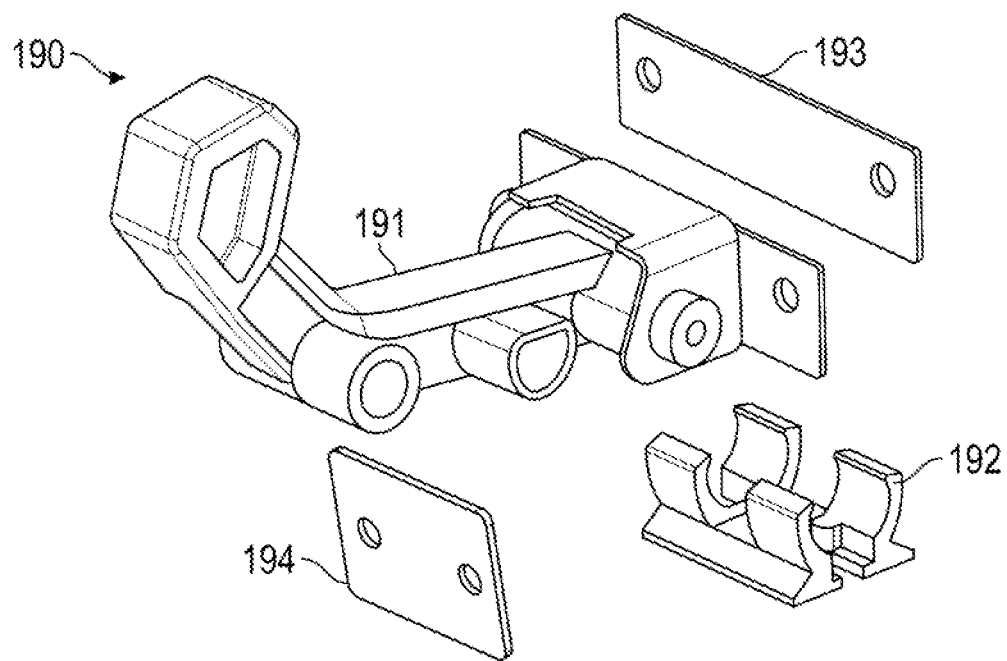
FIG. 2 shows a handle/latch assembly that may be used with the hinged, three-piece windshield of the present invention, according to one embodiment.

FIG. 2 shows one embodiment of the latch and handle hardware that may be utilized in the three-piece flip windshield of the present invention. Assembly 200 includes handle 201 that is mountable to the windshield, preferably using a handle support 203 that is mounted to the middle piece of the windshield using bolts (not shown). Catch 202 is preferably mountable to the windshield, preferably using a catch support 204 that is mounted to the lower piece of the windshield using bolts (not shown).

Figure 3:
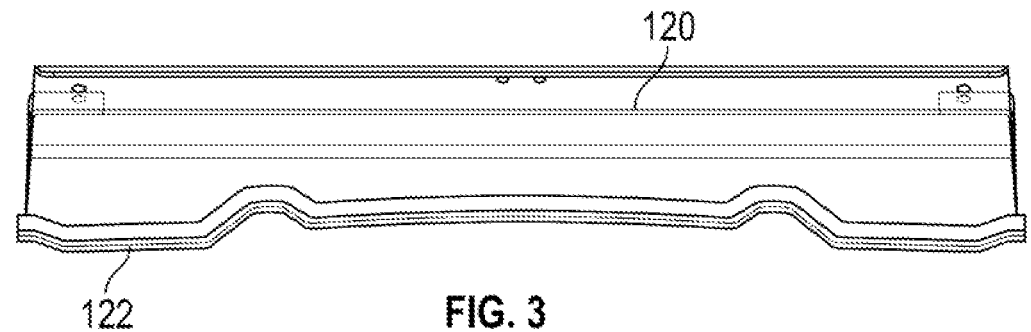
FIG. 3 shows a lower piece of that may be used with the hinged, three-piece windshield of the present invention, according to one embodiment.

FIG. 3 shows one embodiment of the lower windshield portion of the three-piece flip windshield of the present invention. Lower windshield piece 120 may include a flexible seal 122 along its lower edge to seal the gap that may otherwise be present between the power windshield piece and the vehicle hood, thus allowing a good fit without scratching or otherwise damaging the hood during installation or use.

Figure 4:
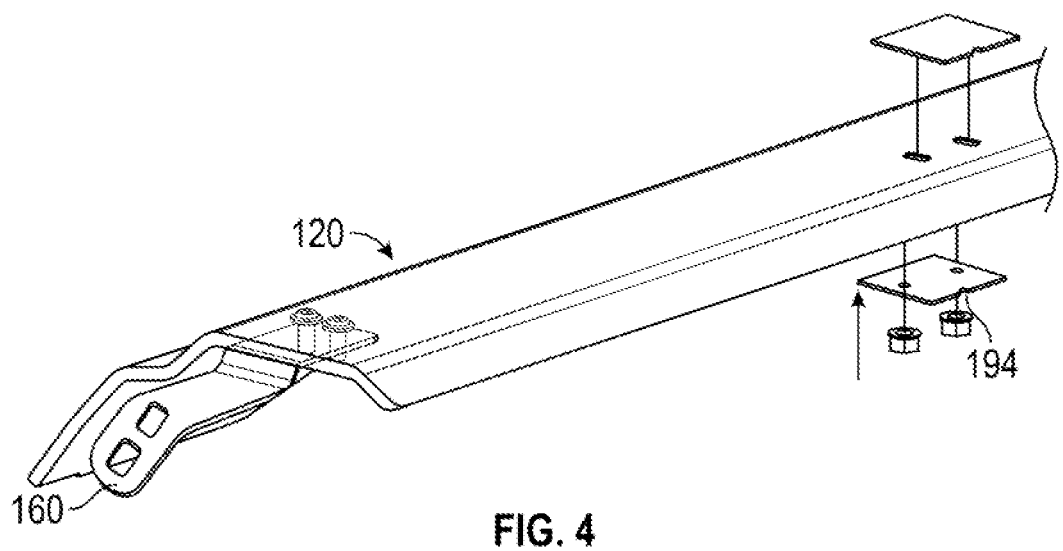
FIG. 4 is another view of a lower piece of that may be used with the hinged, three-piece windshield of the present invention, according to one embodiment.

FIG. 4 shows another view of a lower piece of that may be used with the hinged, three-piece windshield of the present invention, according to one embodiment. Lower windshield piece 120 is mountable to the vehicle cage using clamps 160.

Figure 5:
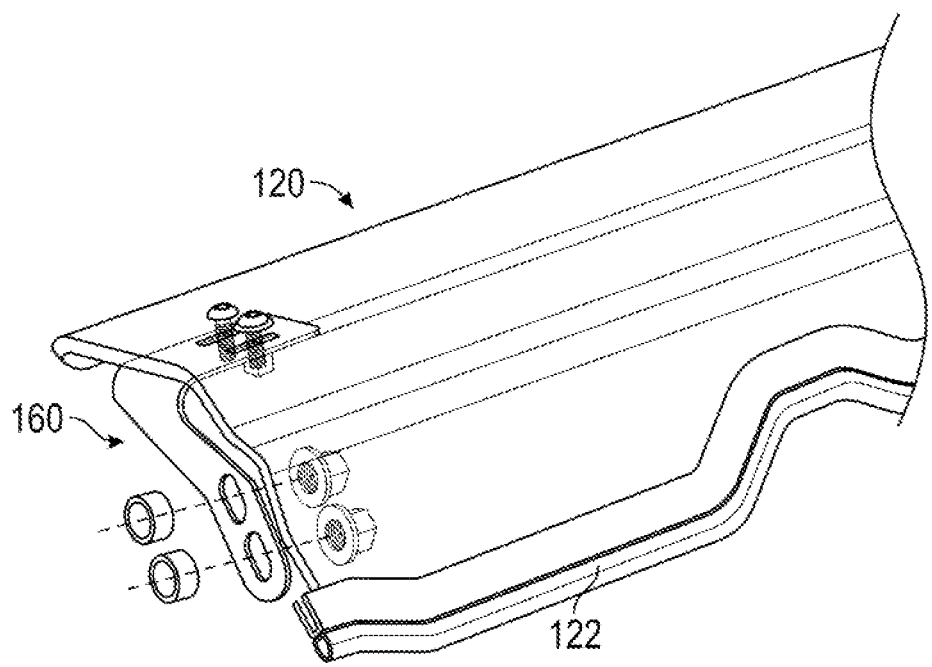
FIG. 5 is a view of the end of a lower piece of that may be used with the hinged, three-piece windshield of the present invention, according to one embodiment.

FIG. 5 shows a view of the end of a lower piece of that may be used with the hinged, three-piece windshield of the present invention, according to one embodiment. Lower windshield piece 120 is mountable to the vehicle cage using clamps 160

Figure 6:
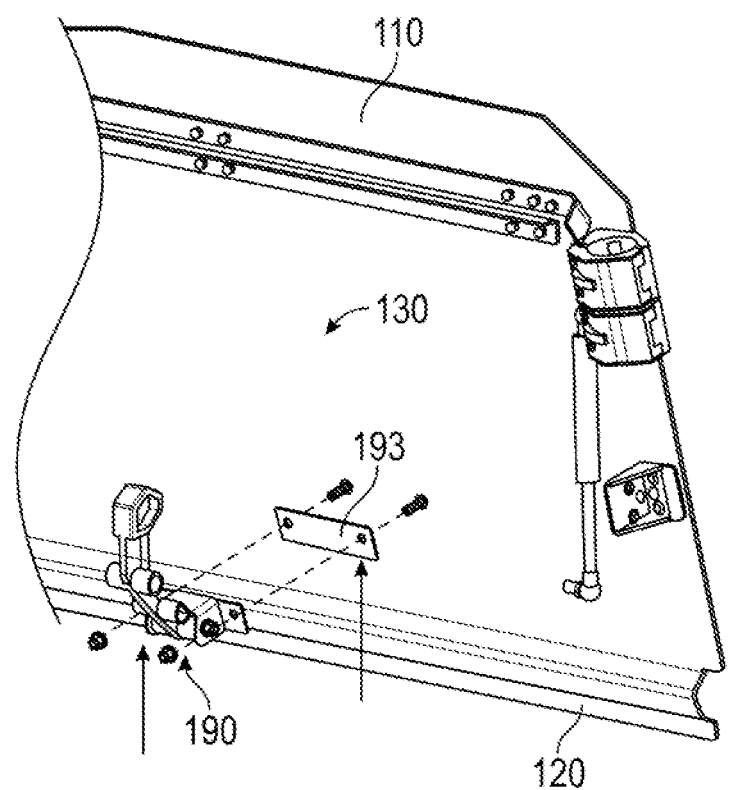
FIG. 6 is another view of the hinged, three-piece windshield of the present invention, according to one embodiment.

FIG. 6 shows another view of the hinged, three-piece windshield of the present invention, according to one embodiment.

Figure 7:
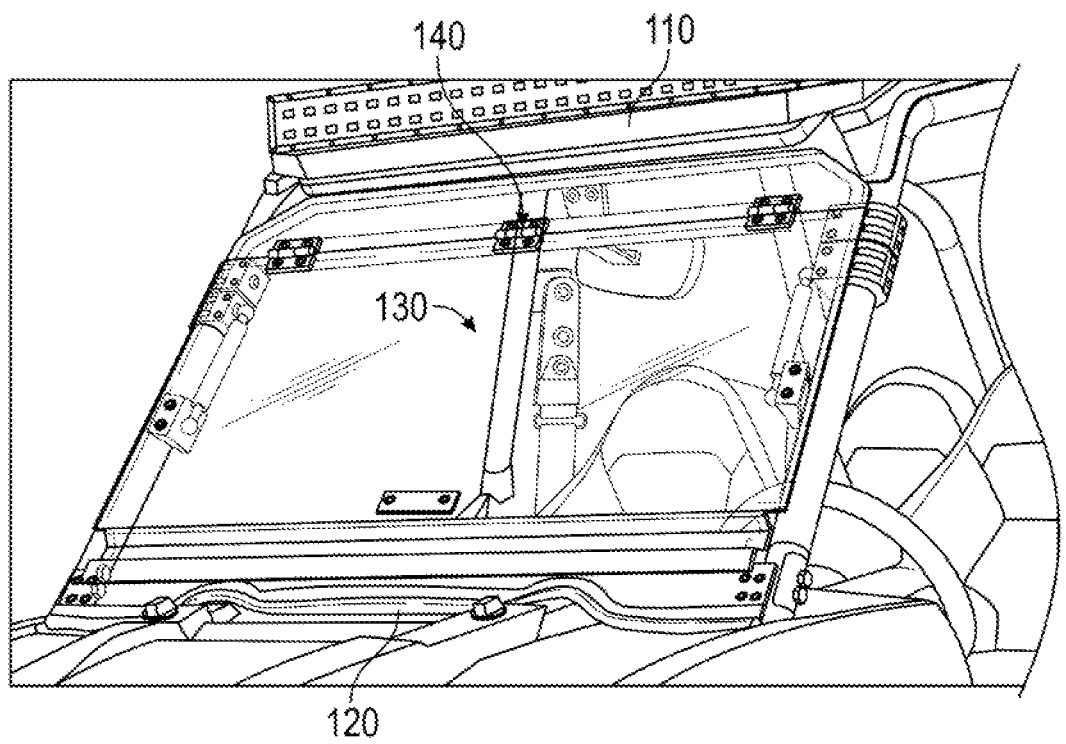
FIG. 7 shows the hinged, three-piece windshield of the present invention installed on an off-road vehicle, according to one embodiment.

FIG. 7 shows the hinged, three-piece windshield of the present invention installed on an off-road vehicle, according to one embodiment.

Figure 8:
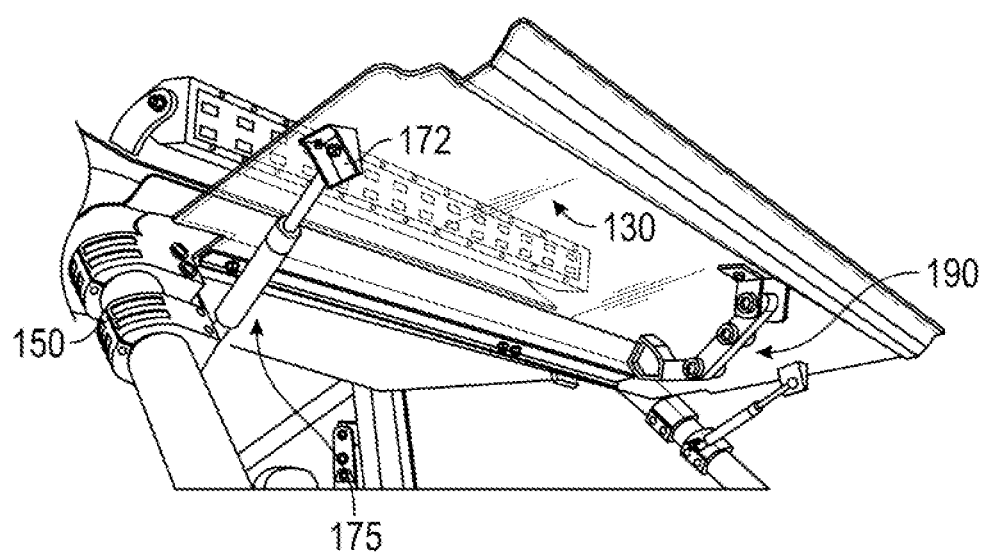
FIG. 8 shows the hinged, three-piece windshield of the present invention installed on an off-road vehicle, with the windshield in its open position, according to one embodiment.

FIG. 8 shows the hinged, three-piece windshield of the present invention installed on an off-road vehicle, with the windshield in its open position, according to one embodiment.

Figure 9:
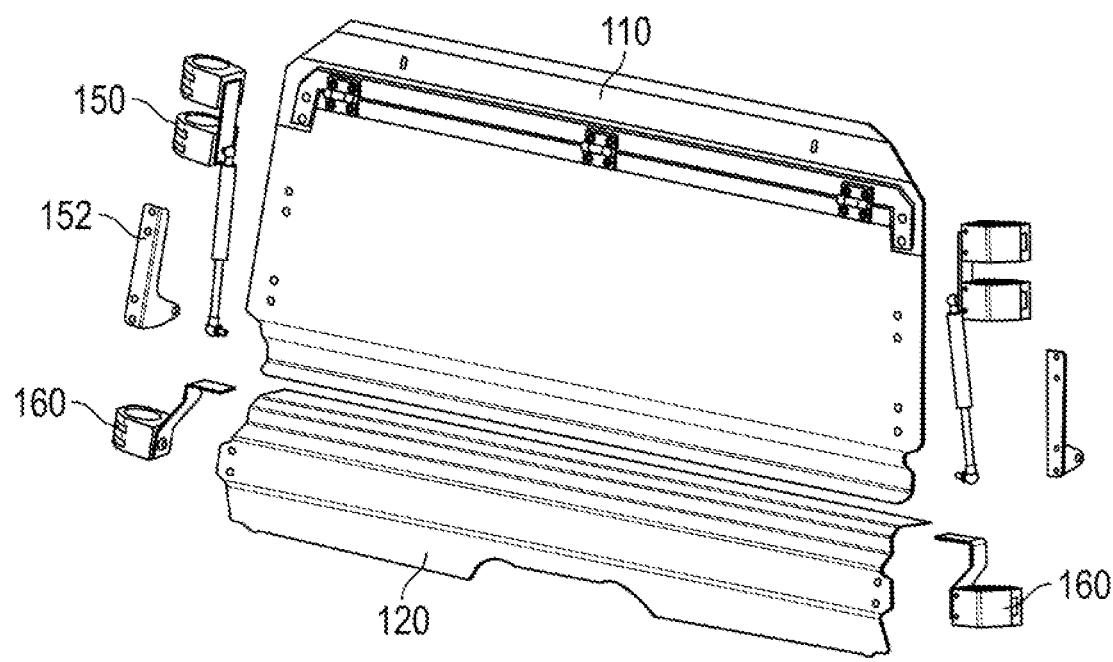
FIG. 9 shows a schematic view of the hinged, three-piece windshield of the present invention, according to one embodiment.

FIG. 9 shows a schematic view of the hinged, three-piece windshield of the present invention, according to one embodiment.

Figure 10:
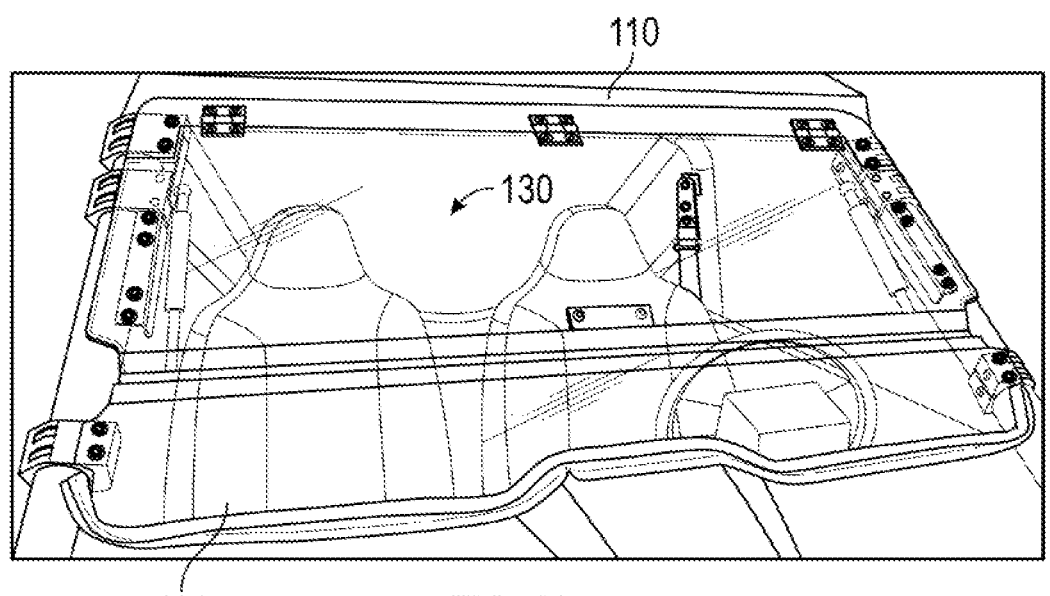
FIG. 10 shows the hinged, three-piece windshield of the present invention installed on an off-road vehicle, with the windshield in its closed position, according to one embodiment.

FIG. 10 shows the hinged, three-piece windshield of the present invention installed on an off-road vehicle, with the windshield in its closed position, according to one embodiment.

Figure 11:
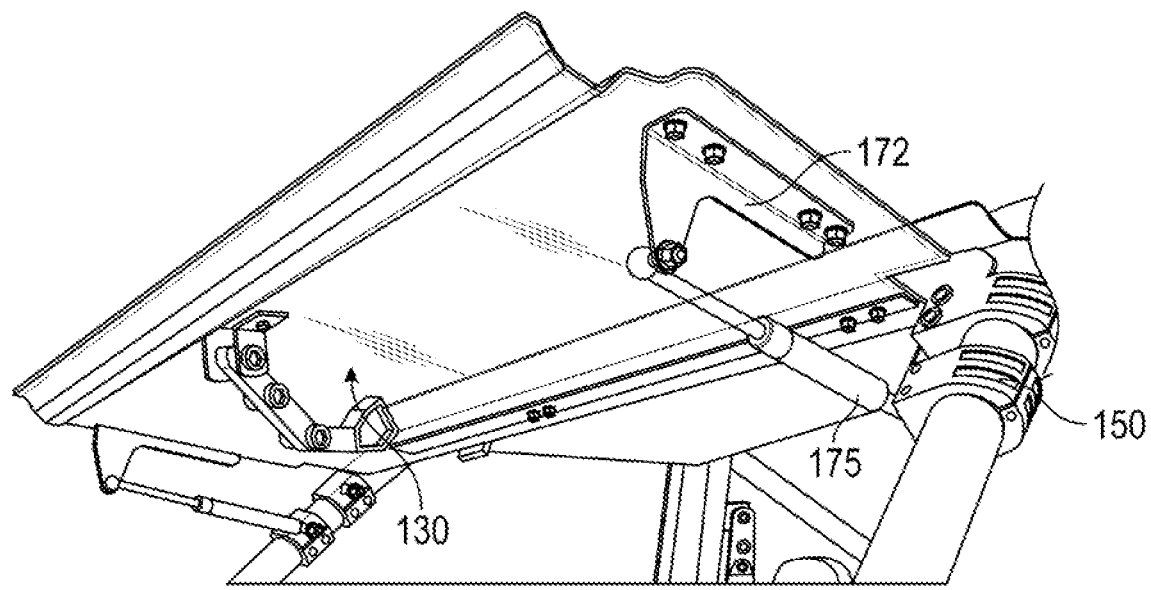
FIG. 11 is another view of the hinged, three-piece windshield of the present invention installed on an off-road vehicle, with the windshield in its open position, according to one embodiment.

FIG. 11 shows another view of the hinged, three-piece windshield of the present invention installed on an off-road vehicle, with the windshield in its open position, according to one embodiment.

Figure 12:
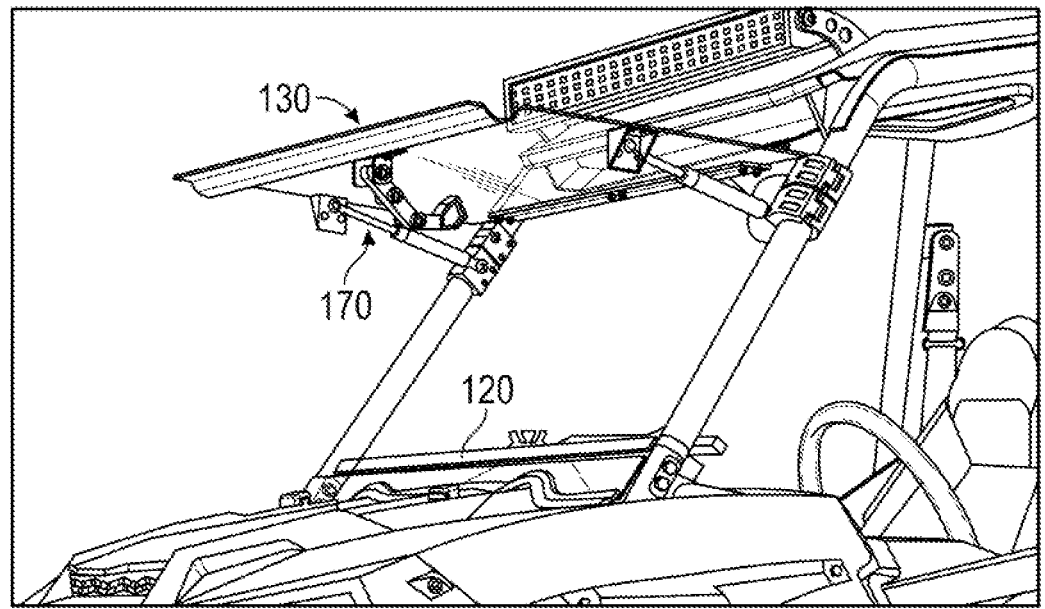
FIG. 12 is another view of the hinged, three-piece windshield of the present invention installed on an off-road vehicle, with the windshield in its open position, according to one embodiment.

FIG. 12 shows another view of the hinged, three-piece windshield of the present invention installed on an off-road vehicle, with the windshield in its "open" position, according to one embodiment. As previous noted, when the central, movable windshield portion 130 is moved top its fully-open position, a gap of more than about 24" is provided between the central, movable windshield portion 130 and the lower fixed windshield portion 120. In this fully opened position, the space between the upper portion, the lower portion, the left vertical member, and the right vertical member is substantially free of windshield protection.

Figure 13:
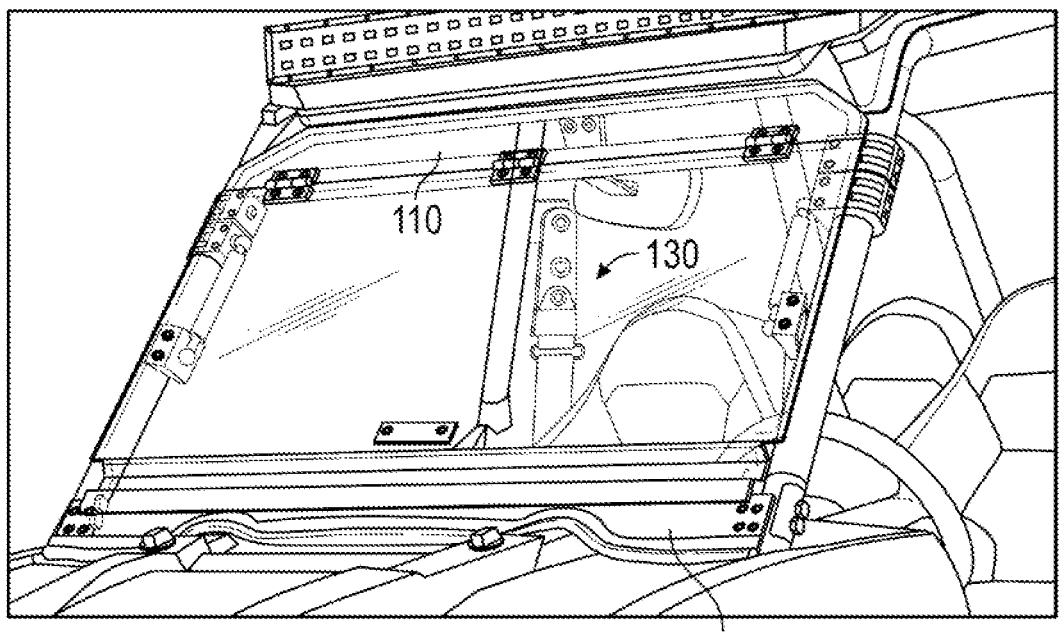
FIG. 13 is another view of the hinged, three-piece windshield of the present invention installed on an off-road vehicle, with the windshield in its closed position, according to one embodiment.

FIG. 13 shows a perspective view of one embodiment of the three-piece flip windshield of the present invention, with the central, movable windshield portion being in its "closed" position. The lower fixed windshield portion 120 spans a lower portion of the area between the left vertical member and the right vertical member. The upper fixed windshield portion 110 spans an upper portion of the area between the left vertical member and the right vertical member. The central, movable windshield portion 130 is hingedly connected to the upper fixed windshield portion and substantially spans the area between the upper fixed windshield portion and the lower fixed windshield portion when positioned in its illustrated closed position.

Figure 14:
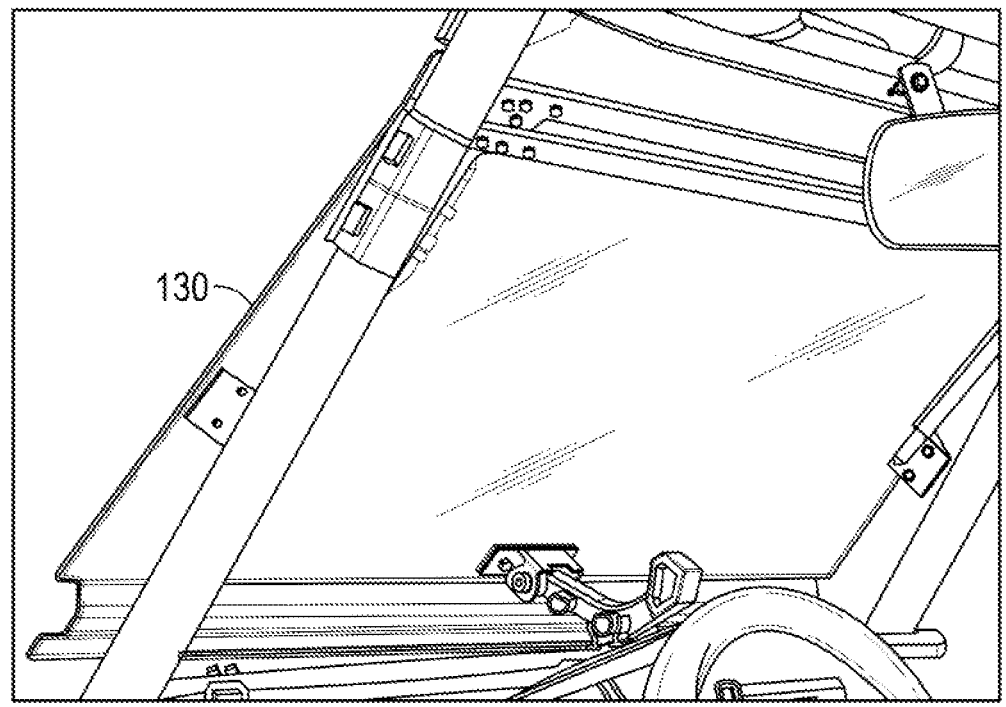
FIG. 14 is another view of the hinged, three-piece windshield of the present invention installed on an off-road vehicle, with the windshield in its partially open position, according to one embodiment.

FIG. 14 shows another perspective view of one embodiment of the three-piece flip windshield of the present invention, with the central, movable windshield portion 130 in its "partially-open" position. In the illustrated partially-open position, a gap of less than about 6" is provided between the central, movable windshield portion 130 and the lower fixed windshield portion 120.

Figure 15:
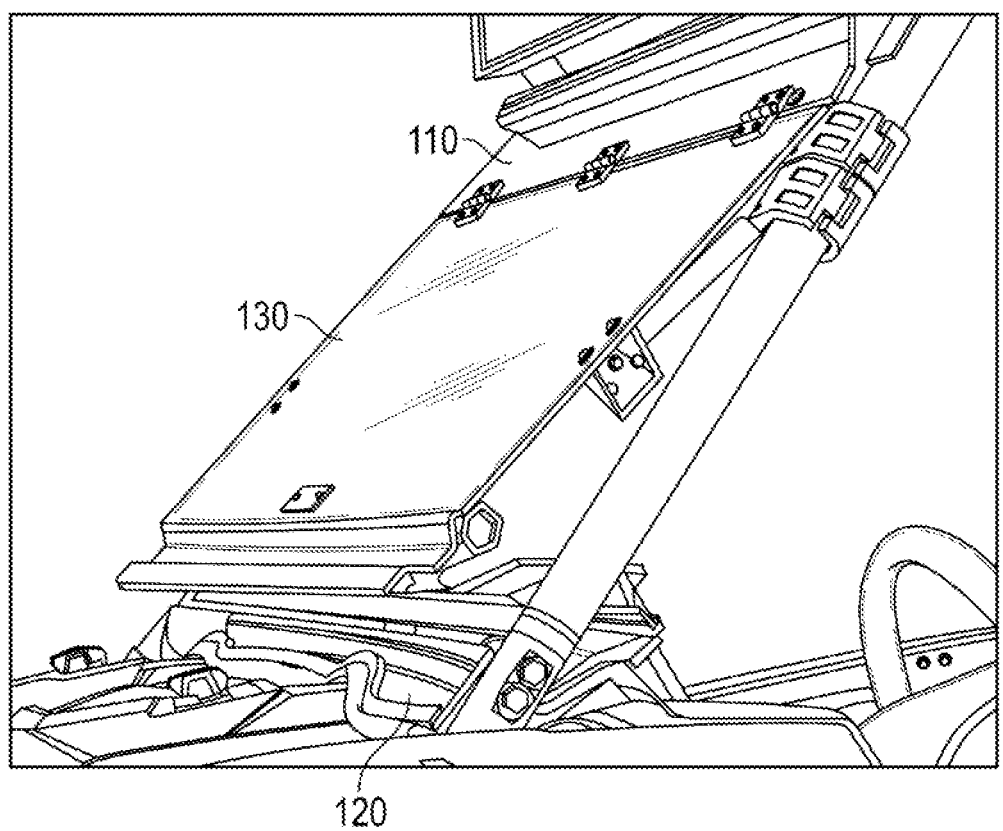
FIG. 15 is another view of the hinged, three-piece windshield of the present invention installed on an off-road vehicle, with the windshield in its partially open position, according to one embodiment.

FIG. 15 shows another perspective view of one embodiment of the three-piece flip windshield of the present invention, with the central, movable windshield portion being in a "partially open" position. In the illustrated partially-open position, a gap of less than about 6" is provided between the central, movable windshield portion 130 and the lower fixed windshield portion 120.

Figure 16:
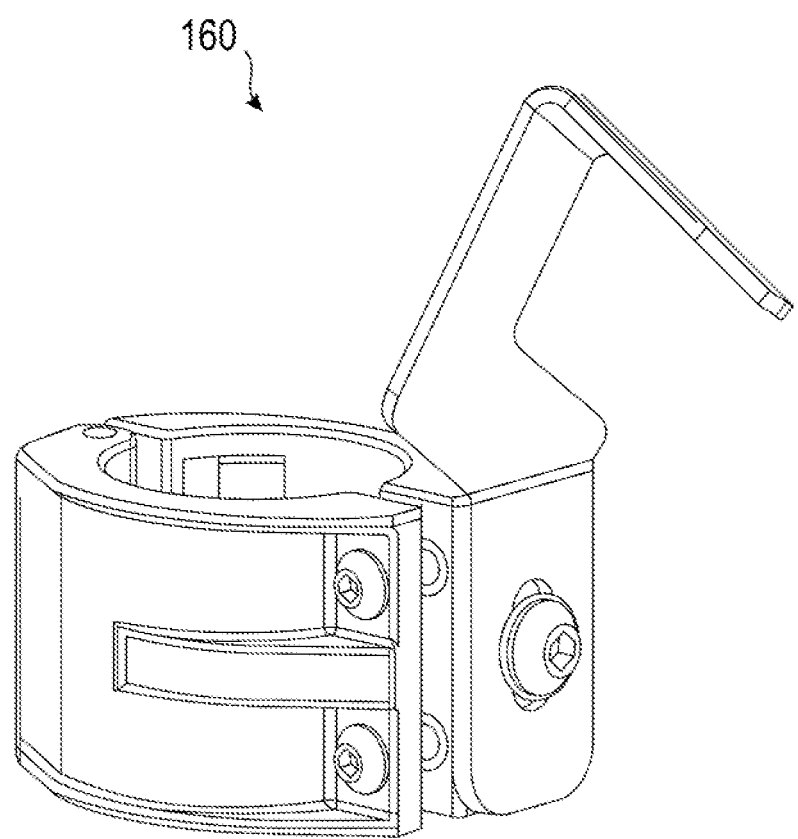
FIG. 16 shows a clamp that may be used with the hinged, three-piece windshield of the present invention, according to one embodiment.

FIG. 16 shows a perspective view of a stylized mounting clamp 160 used in one embodiment of the three-piece flip windshield of the present invention.

While the invention has been illustrated and described in detail in the drawings and foregoing description, the same are to be considered as illustrative and not restrictive, it being understood that only certain preferred embodiments have been shown and described and that all changes and modifications that come within the spirit of the invention are desired to be protected. In addition, it is to be appreciated that the present invention may comprise or consist essentially of any or all of the described or illustrated features. For example, the present invention includes devices and methods comprising any or all of the features described or illustrated in specification or drawings, and the present invention includes devices and methods consisting essentially of any or all of the features illustrated in the specification or drawings. Additionally, any or all of the features and/or embodiments disclosed herein may be combined with any or all of the other features and/or embodiments disclosed herein to provide a device or method that comprises or consists essentially of such features.

Finally, the grammatical device "and/or" (such as in "A and/or B") is used in this disclosure to mean A alone, or B alone, or both A and B.

The invention claimed is:

1. A multiple-piece windshield assembly comprising at least three parts and configured to mount to a vehicle having a left vertical member and a right vertical member and at least one cross support member connecting the left vertical member and the right vertical member, the assembly comprising:
   a) a lower fixed windshield portion spanning a lower portion of a space between the left vertical member and the right vertical member;
   b) an upper fixed windshield portion spanning an upper portion of the area space between the left vertical member and the right vertical member;
   c) a central, movable windshield portion hingedly connected to the upper fixed windshield portion and adapted to substantially span the space between the upper fixed windshield portion and the lower fixed windshield portion when positioned in a closed position; wherein the central, movable windshield portion is movable to a fully-open position in which a gap of more than about 24" is provided between the central, movable windshield portion and the lower fixed windshield portion.

2. A vehicle windshield assembly according to claim 1 wherein the central, movable windshield portion is additionally movable to a partially-open position in which a gap of less than about 6" is provided between the central, movable windshield portion and the lower fixed windshield portion.

3. A vehicle windshield assembly according to claim 1 wherein the upper fixed windshield portion is attachable to the cross support member; and wherein the lower fixed windshield portion and the central, movable windshield portion are each attachable to the left vertical member and to the right vertical member.

4. A vehicle windshield assembly according to claim 1 wherein the assembly additionally comprises one or more struts for holding the central, movable windshield portion in its fully-open position.

5. A vehicle windshield assembly according to claim 1 wherein the assembly additionally comprises a handle for assisting with moving the central, movable windshield portion from its closed position to its fully-open position.

6. A vehicle windshield assembly according to claim 1 wherein the assembly additionally comprises a latch for securing the central, movable windshield portion in its closed position.

7. A vehicle windshield assembly according to claim 6 wherein the latch is additionally effective for securing the central, movable windshield portion in its partially-open position.

8. A removable windshield assembly for attachment to an open, tubular roll-over protection system cage mounted to a vehicle body, wherein the vehicle cage comprises a pair of spaced-apart vertical support members, one on each side of a passenger compartment, and a horizontal cross member connecting an upper end portions of the two vertical support members, and optionally including a vehicle roof member; the windshield assembly comprising:
   a) an upper portion adapted to abut the roof of the vehicle in a manner to prevent a gap between the roof and the windshield and substantially spanning an uppermost portion of the space between the left vertical member and the right vertical member;
   b) a lower portion substantially spanning a lowermost portion of the space between the left vertical member and the right vertical member; and
   c) a main viewing portion hingedly attached to the upper portion in a manner effective to allow the main viewing portion to be moved from a closed position to an open position;
   wherein when the main viewing portion is in its closed position the main viewing portion substantially spans the space between the upper portion, the lower portion, the left vertical member, and the right vertical member; and when the main viewing portion is in its open position the space between the upper portion, the lower portion, the left vertical member, and the right vertical member is substantially free of windshield protection.

* * * * *

UNITED STATES PATENT AND TRADEMARK OFFICE
CERTIFICATE OF CORRECTION

PATENT NO. : 11,472,268 B1
APPLICATION NO. : 17/660040
DATED : October 18, 2022
INVENTOR(S) : Justin Vanover It is certified that error appears in the above-identified patent and that said Letters Patent is hereby corrected as shown below:

In the Claims

Column 7, Line 16, delete "area"

Signed and Sealed this
Fifteenth Day of November, 2022

Katherine Kelly Vidal
*Director of the United States Patent and Trademark Office*